United States Patent
Omori et al.

(10) Patent No.: US 9,756,241 B2
(45) Date of Patent: Sep. 5, 2017

(54) IMAGE CAPTURING APPARATUS

(71) Applicant: Sharp Kabushiki Kaisha, Osaka-shi, Osaka (JP)

(72) Inventors: Keisuke Omori, Osaka (JP); Kei Tokui, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/781,672

(22) PCT Filed: Mar. 27, 2014

(86) PCT No.: PCT/JP2014/058848
§ 371 (c)(1),
(2) Date: Oct. 1, 2015

(87) PCT Pub. No.: WO2014/168014
PCT Pub. Date: Oct. 16, 2014

(65) Prior Publication Data
US 2016/0028948 A1    Jan. 28, 2016

(30) Foreign Application Priority Data
Apr. 10, 2013  (JP) ................................ 2013-082457

(51) Int. Cl.
*H04N 5/232* (2006.01)
*H04N 5/235* (2006.01)
(Continued)

(52) U.S. Cl.
CPC ......... *H04N 5/23232* (2013.01); *G06T 5/003* (2013.01); *G06T 5/50* (2013.01);
(Continued)

(58) Field of Classification Search
CPC ............. H04N 5/23212; H04N 5/2254; H04N 5/23238; H04N 9/045; H04N 1/00307;
(Continued)

(56) References Cited

U.S. PATENT DOCUMENTS 8,937,677 B2 *  1/2015  Lee ................. H04N 5/222
                                                348/333.1
2010/0128163 A1 *  5/2010  Nagasaka ............ H04N 5/2356
                                                348/348

(Continued)

FOREIGN PATENT DOCUMENTS

EP    2 007 135 A2    12/2008
JP    2005-277813 A    10/2005

(Continued)

OTHER PUBLICATIONS

Official Communication issued in International Patent Application No. PCT/JP2014/058848, mailed on Jul. 1, 2014.

*Primary Examiner* — Trung Diep
(74) *Attorney, Agent, or Firm* — Keating & Bennett, LLP

(57) ABSTRACT

An image capturing apparatus including an image capturing unit that captures an image, a focus control unit that controls a focus of the image capturing unit, an object selection reception unit that receives a selection operation of an object, and an image processing unit that performs image processing of an image that is captured by the image capturing unit, in which the image capturing unit captures plural images in which the focus is changed by the focus control unit, at least one of the plural images is captured based on a focal position of a selected object that is received by the object selection reception unit, and the image processing unit generates an image in which a depth of field is expanded compared to the one captured image from the plural images.

2 Claims, 11 Drawing Sheets

(51) Int. Cl.
*G06T 5/00* (2006.01)
*G06T 5/50* (2006.01)

(52) U.S. Cl.
CPC ....... *H04N 5/2356* (2013.01); *H04N 5/23212* (2013.01); *H04N 5/23229* (2013.01); *H04N 5/23293* (2013.01); *G06T 2207/10148* (2013.01); *G06T 2207/20221* (2013.01); *H04N 5/23216* (2013.01)

(58) Field of Classification Search
CPC ............ H04N 5/23232; H04N 5/2351; H04N 5/2353; G02B 27/0075; G02B 27/58; G02B 7/38; G03F 7/70433; G03B 3/00; G03B 7/14
See application file for complete search history.

(56) References Cited

U.S. PATENT DOCUMENTS

| | | | |
|---|---|---|---|
| 2012/0050562 A1* | 3/2012 | Perwass | H04N 5/2254 348/222.1 |
| 2013/0286259 A1 | 10/2013 | Tanaka | |
| 2014/0016016 A1* | 1/2014 | Berestov | H04N 5/23212 348/345 |

FOREIGN PATENT DOCUMENTS

| | | |
|---|---|---|
| JP | 2009-027212 A | 2/2009 |
| JP | 2009-088742 A | 4/2009 |
| WO | 2012/132129 A1 | 10/2012 |

* cited by examiner (a)

(b)

IMAGE CAPTURING APPARATUS

TECHNICAL FIELD

The present invention relates to an image capturing apparatus that is capable of photographing an image with a large depth of field, particularly to an image capturing apparatus that generates an output image from plural images.

BACKGROUND ART

As a technology for capturing a clear image in focus, an autofocus technology has been known in which the focus is automatically set on a prescribed position. As procedures of the autofocus technology, various procedures such as a retardation procedure and a contrast procedure have been known. Recently, an autofocus of the contrast procedure is installed in compact digital cameras and many cameras installed in cellular phones. In the contrast procedure, a position where a high frequency component of a picture cast on an image capturing element is high (high contrast) is searched for while a focus lens is moved, and the focus is thereby set. The focal position may be decided by calculating the high frequency component around a center of the picture, the focal position may be decided by calculating the high frequency components in whole the picture, the focal position may be decided by calculating the high frequency component of an object that is selected on a touch panel by an operator, and so forth. The autofocus allows the operator (photographer) him/herself not to have to adjust the focus and enables a clear image in focus to be captured by a simpler operation.

However, in a case where plural objects are present in different distances and the focus is set on one of the objects by the autofocus, the focus may not be set on the other object in the different distance.

Accordingly, there has been developed a technology for obtaining a clear image in which all plural objects are in focus in a case where the plural objects whose images the operator desires to capture are present and the objects are in positions in different distances. For example, PTL 1 mentioned below discloses that plural images are successively captured in different focal positions, the images of the plural objects that are common to the images are extracted from the respective clearest captured images and synthesized, and an image in which all the plural objects are clear is thereby obtained.

CITATION LIST

Patent Literature

PTL 1: Japanese Unexamined Patent Application Publication No. 2009-88742

SUMMARY OF INVENTION

Technical Problem

However, an image capturing method disclosed in PTL 1 has a problem that the object whose clear image the operator desires to capture by setting the focus on may not be positioned in any of the plural focal positions and the target object becomes unclear in such a case. FIG. 26 illustrates positions of four objects 2601, 2602, 2603, and 2604 and focal positions 2605, 2606, and 2607 in a case of successively capturing three images. The arrows indicated on the focal position 2605, 2606, and 2607 in FIG. 26 indicate the depths of field in a case of capturing images in the respective focal positions. In FIG. 26, clear images in focus of the three objects 2601, 2602, and 2604 may be obtained because the objects 2601, 2602, and 2604 are positioned in the depths of field of any of the three focal positions. However, because the object 2603 is not positioned in the depth of field of any of the focal positions, the image of the object 2603 is not captured as a clear image in focus in any of the three captured images.

FIG. 27 is a diagram in which new focal positions 2701, 2702, 2703, and 2704 are added to the three focal positions 2605, 2606, and 2607 in FIG. 26. As illustrated in FIG. 27, capturing images while increasing the number of captured images and finely changing the focal position increases the probability that an image of the object whose image the operator desires to capture is captured as a clear image in focus. However, in a case where the number of captured image increases, the time necessary for image capturing becomes longer, resulting in a larger offset in corresponding points between plural images in a case of photographing a moving object. Consequently, a search for the corresponding points becomes difficult, and image synthesis becomes difficult. A preferable image with a large depth of field is not necessarily obtained by increasing the number of captured images.

The present invention has been made in consideration of the above point, and an object thereof is to provide an image capturing apparatus that is capable of capturing an image in a focal position that reflects an intention of an operator and of obtaining a clear image in which a target object is in focus.

Solution to Problem

One aspect of the present invention provides an image capturing apparatus including: an image capturing unit that captures an image; a focus control unit that controls a focus of the image capturing unit; an object selection reception unit that receives a selection operation of an object; and an image processing unit that performs image processing of an image which is captured by the image capturing unit, in which the image capturing unit captures plural images in which the focus is changed by the focus control unit, and at least one of the plural images is captured based on a focal position of a selected object that is received by the object selection reception unit.

As described above, images of plural objects that are selected by an object selection means which reflects an intention of an operator may be captured in a focal position based on selection information. An image is captured only in either one of focal positions, and an image in which two selected objects are in focus may thereby be obtained.

Here, in a case where the larger number of objects are selected by the operator than the configured number of captured images, the focal positions are reconfigured taking object positions and the depths of field into account, and preferable image capturing may thereby be realized with the configured number of images.

As for the reconfiguration, in a case where the depths of field in the focal positions overlap with each other, the focal position may be reconfigured to either one of positions or an intermediate position. In a case where the depths of field of the objects in the focal position do not at all overlap, a new focal position may be configured between the objects.

The object selection reception unit receives priority for an operator, and at least one of the plural images is captured in a focal position in which a focusing degree of an object with high priority which is received by the object selection reception unit becomes high.

In a case where minimum necessary focal positions for capturing images in which all the selected objects are in focus are less than the configured number of captured images, the focal position is configured to a new point so that an image in which two objects are in focus may be obtained by capturing one image.

At least one of the plural images is captured in a focal position that is positioned between focal positions of plural objects whose selection is received by the object selection reception unit.

The focus control unit controls the focus such that a moving direction of respective focal positions in a case of capturing the plural images becomes a same direction.

The image processing unit generates an image in which a depth of field is expanded compared to the one captured image from the plural images.

This specification includes the contents disclosed in the specification and/or the drawings of Japanese Patent Application No. 2013-082457, upon which the priority of this application is based.

Advantageous Effects of Invention

The present invention enables a clear image in which plural selected objects are in focus to be obtained.

DESCRIPTION OF EMBODIMENTS (First Embodiment)

Figure 1:
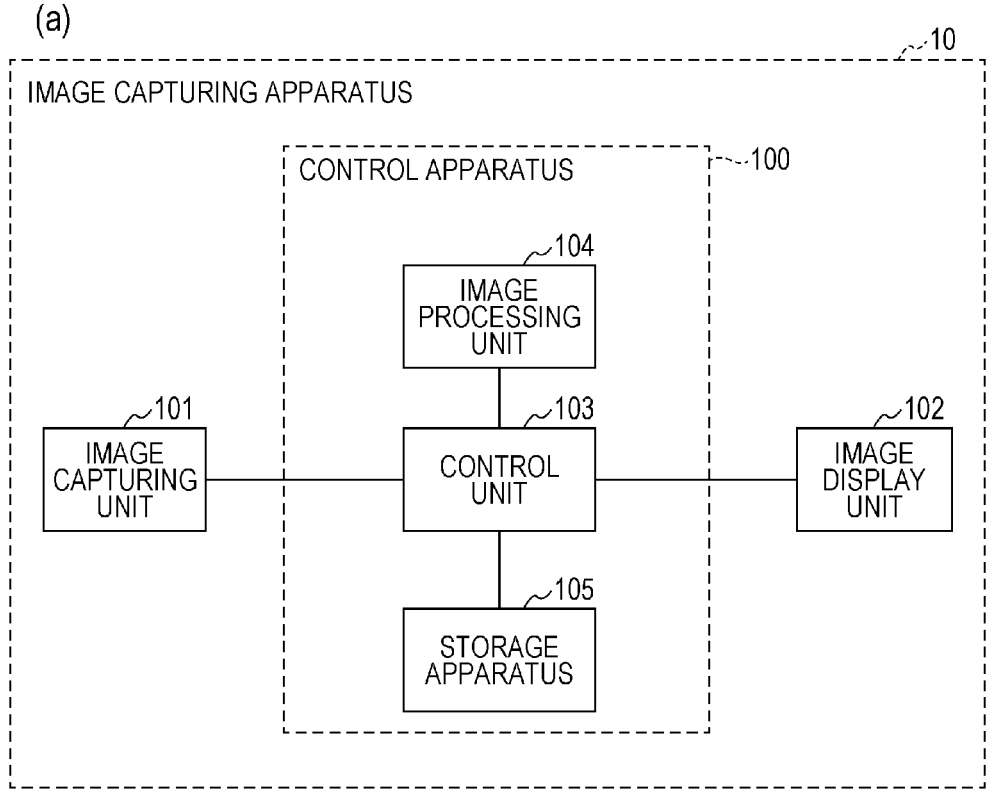
FIG. 1 is a schematic block diagram that illustrates a configuration of an image capturing apparatus according to an embodiment of the present invention.
Figure 1:
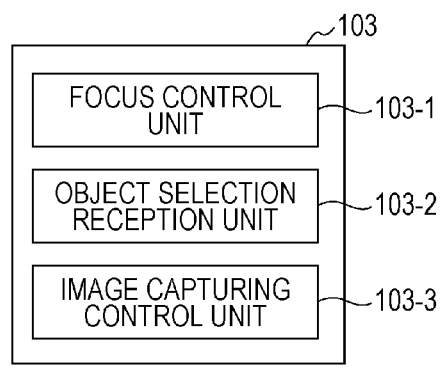

An embodiment of the present invention will hereinafter be described with reference to drawings. FIG. 1 is a schematic block diagram that illustrates a configuration of an image capturing apparatus 10 according to this embodiment.

The image capturing apparatus 10 is configured to include a control apparatus 100, an image capturing unit 101, and an image display unit 102. The control apparatus 100 is configured to include a control unit 103, an image processing unit 104, and a storage apparatus 105.

The image capturing unit 101 is configured to include an image capturing device such as a charge coupled device (CCD), a lens, a lens driving unit, and so forth.

The image display unit 102 displays an image represented by an output image signal that is input from the control apparatus 100. The image display unit 102 is a liquid crystal display, for example. The image display unit 102 may include a touch panel function. A touch panel is an apparatus that senses a touch on a picture or an area that is displayed on a display screen and outputs the touch as an information signal to the outside. There are touch panels such as a resistive film type that senses the voltage of an operating position and a capacitance type that catches a change in the capacitance between a fingertip and a conductive film and thereby detects a position. The touch panel performs an action that corresponds to positional information and an operation on the screen by an operator.

The control unit 103 performs control of a drive of the lens (not illustrated) of the image capturing unit 101, reception of input signals from input apparatuses (not illustrated) such as a power button and a shutter button, image display on the image display unit 102, and so forth. The control unit 103 is realized by executing a program by hardware such as a central processing unit (CPU) or a graphics processing unit (GPU) that is included in the image capturing apparatus 10.

As illustrated in FIG. 1(*b*), the control unit 103 has a focus control unit 103-1, an object selection reception unit 103-2, and an image capturing control unit 103-3. The image processing unit 104 analyzes sharpness or the like with respect to plural input images that are input and thereby synthesizes one image based on an analysis result. Further, the image processing unit 104 may be realized by hardware such as an application specific integrated circuit (ASIC) or a field programmable gate array (FPGA), for example.

Figure 2:
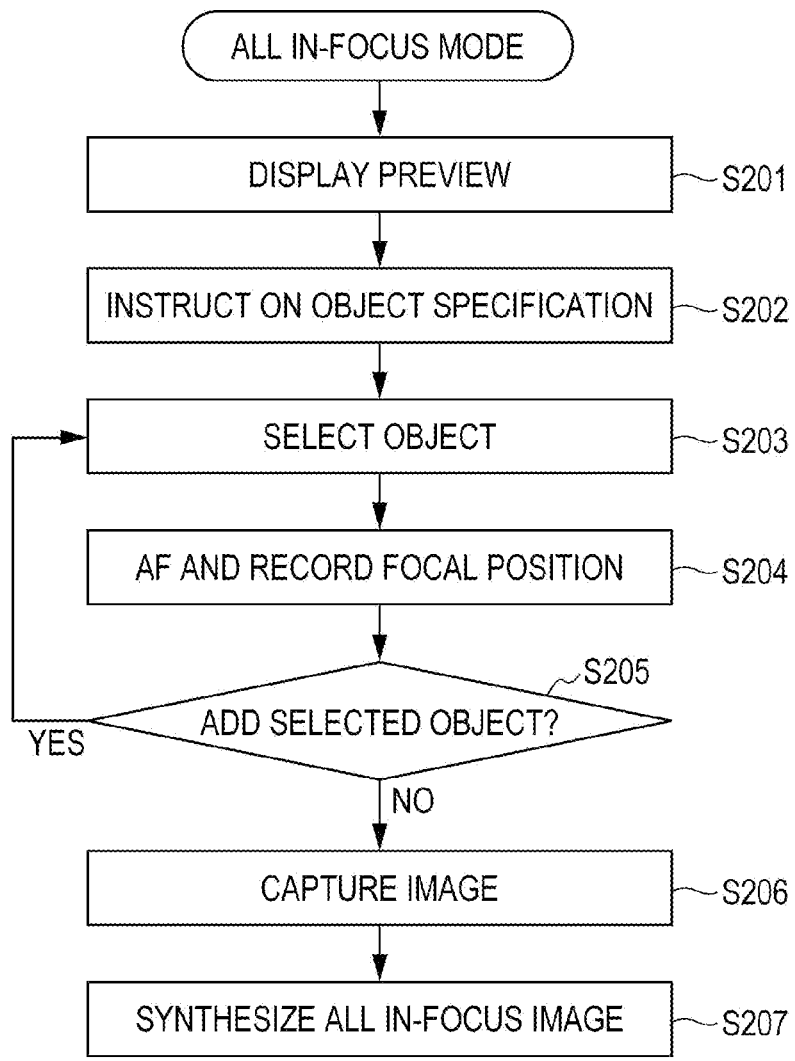
FIG. 2 is a flowchart that illustrates one example of a flow of a control process in accordance with an operation by an operator in an image capturing mode in which plural images are successively captured in different focal positions in the image capturing apparatus according to this embodiment.

FIG. 2 is a flowchart that illustrates one example of a flow of a control process in accordance with an operation by the operator in an image capturing mode in which plural images are successively captured in different focal positions in the image capturing apparatus 10 according to this embodiment. "Successively capturing images (successive image capturing)" means that plural images are captured in a short time. "Successively capturing images while changing the focal position" means that images are sequentially captured in a sequence where the first image is captured in a certain focal position, the focal position is moved after the first image capturing is finished, the second image is captured in a new focal position, the focal position is moved after the second image capturing is finished, and the third image is captured in a new focal position. Hereinafter, this image capturing mode will be referred to as "all in-focus mode", and an operation in a state where the all in-focus mode is selected will be described.

When the all in-focus mode is configured, an image photographed by the image capturing unit 101 is displayed on the image display unit 102 as a preview screen (S201). Next, an instruction that advises the operator to specify the object that the operator desires to photograph is output to the image display unit 102 (S202). When an input about object selection from the operator is detected (S203), the object selection reception unit 103-2 of the control unit 103 causes a focus control signal to be output from the image capturing control unit 103-3 of the control unit 103 to the image capturing unit 101 so that the focus is set on the specified object. Then, focal position information that provides the best focus, which is detected by control by the focus control unit 103-1 of the control unit 103, is recorded in the storage apparatus 105 (S204). Next, the object selection reception unit 103-2 determines whether or not a different object from the object selected in S203 is further selected (S205). In a case where further selection of an object is not performed and the operator selects image capturing, the object selection is finished, and the process progresses to S206.

In a case where a new object is selected, the process returns to S203, and position information that provides the best focus on the newly specified object is recorded in the storage apparatus 105.

As described above, S203 to S205 are repeated until the object selection by the operator is finished. Other than the configuration that repeats S203 to S205, a configuration may be used in which all the objects whose image the operator desires to capture are selected in S203, the respective focal positions of the objects are thereafter calculated in S204, and the process then progresses to S205. In a case where the object selection is finished in S205, the process progresses to S206. In S206, an image is captured while the focus is set on the focal position that is decided based on the focal position information recorded in the storage apparatus 105. Adjustment of the focal position and image capturing are repeated until capturing all the images is finished. When the image capturing is finished, an all in-focus image is generated from the captured images by the image processing unit 104 (S207).

Next, each step of the flowchart illustrated in FIG. 2 will be described in detail. First, preview display in S201 will be described. When the all in-focus mode is configured, an image in which the focus is set on a prescribed focal position by autofocus is first displayed on the preview screen. Because it is preferable that all the objects be in focus to the extent that the operator may identify the plural objects on the preview screen when the objects are selected in S203 described below, a state where the foreground to the background are in focus is preferable compared to a state where the foreground is particularly in focus but the background is blurry or a state where the background is particularly in focus but the foreground is blurry. In order to realize the state where the foreground to the background are in focus to the extent that the objects are identifiable, for example, the focal position is decided by calculating the contrast of not only the center of the screen but also whole the screen in autofocusing, and the probability of obtaining the above-described particular states may thereby be reduced. Further, in a case where an image in which the focus is set on a prescribed focal position that is in advance decided is displayed when the all in-focus mode is configured, the focal position does not change in accordance with the scene. Thus, the state where the focal position is particularly in the foreground or the background may be avoided. Further, closing a diaphragm may increase the depth of field.

Figure 3:
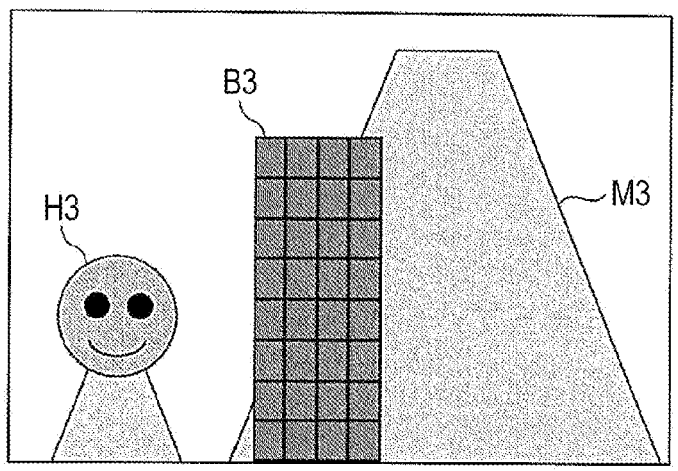
FIG. 3 is a diagram that illustrates one example of a preview screen.

FIG. 3 illustrates one example of the preview screen in S201. In FIG. 3, objects are arranged in the order of an object H3 (person), an object B3 (building), and an object M3 (mountain) from the front. In a preview state, the control apparatus 100 displays an instruction on the image display unit 102 to advise the operator to select the object whose image the operator desires to capture by setting the focus on. As for the instruction to be displayed, for example, "select the object whose image you want to capture" is displayed, and the operator may thereby be advised to perform the object selection. In a case where the image display unit 102 is a touch panel, "touch the object whose image you want to capture" is displayed, and the operator may thereby be advised to perform the object selection. Further, an upper limit is set for the number of selectable objects, and the intention of the operator may thereby be reflected more. For example, an expression of "select three most desired objects to photograph" may advise the operator to perform the object selection that more reflects the intention of the operator than simple selection. Setting the upper limit is preferable for an all in-focus image synthesis, which will be described below, because a focal position configuration that attaches importance to the intention of the operator may be performed and an effect of reducing the time that is needed between the start of selection and the end of selection may be expected. Further, the instruction may be output as a sound signal from a speaker (not illustrated) installed in the image capturing apparatus 10. In this embodiment, the operator is advised to perform the object selection that reflects his/her intention (the plural object whose image the operator desires to capture), the images are successively captured while the focal position is decided based on the selection information, and a preferable synthesized image that conforms to the intention of the operator is thereby synthesized.

Next, an object selection method for the operator in S203 will be described.

As for a selection means, for example, in a case where the image display unit 102 is a touch panel, the operator may touch the object displayed on the preview screen to select the object. Further, although not a touch panel, for example, a cursor is displayed on the preview screen, the cursor is moved to the target object by an input apparatus that is capable of operating the cursor vertically and horizontally, for example, a directional pad, and the object may thereby be selected by an input apparatus such as a confirmation button when the cursor has been moved to the object. Those operations are detected by the object selection reception unit 103-2.

Figure 4:
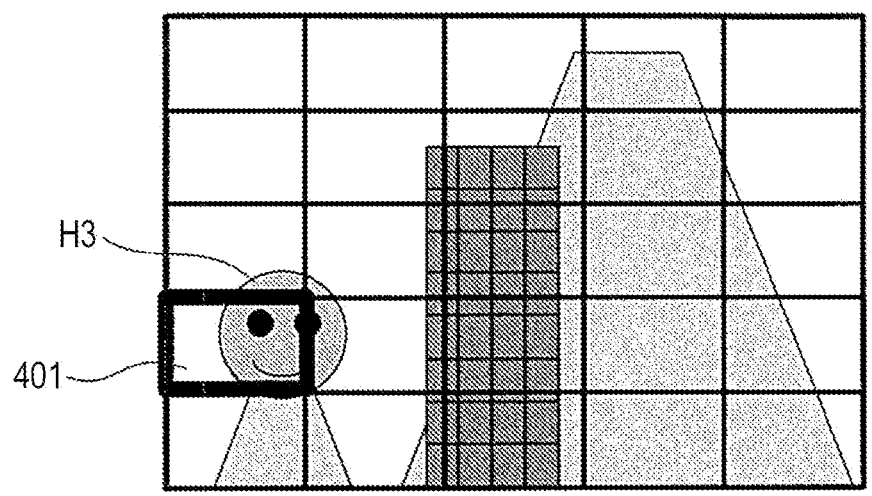
FIG. 4 is an image display surface where the image display surface of FIG. 3 as an example is divided into 25 parts.
Figure 5:
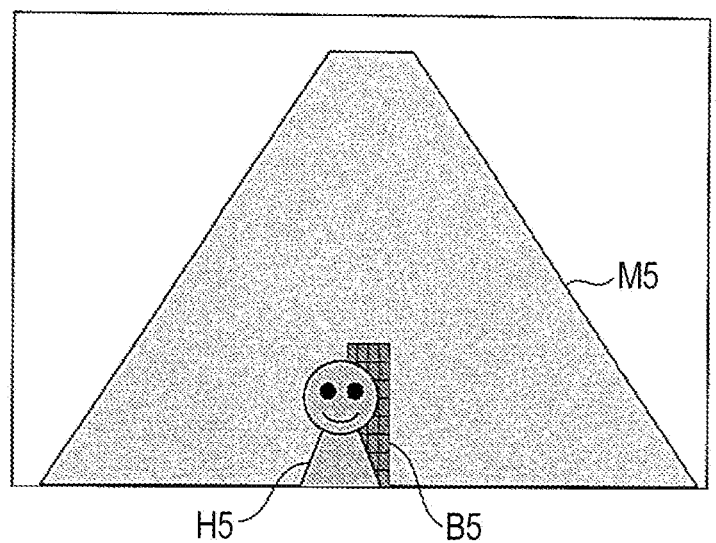
FIG. 5 is a diagram that illustrates one example of the preview screen that is displayed on the image display surface.
Figure 6:
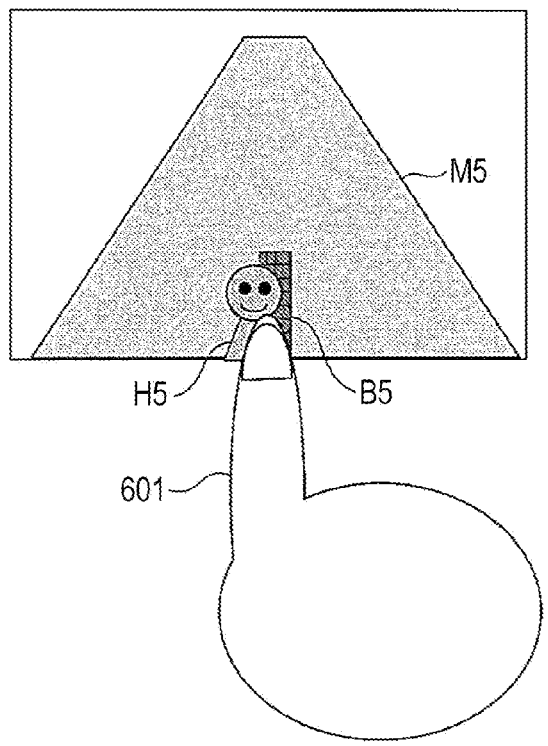
FIG. 6 is a diagram that illustrates a situation where the operator touches only an object on the image display surface by a finger.
Figure 7:
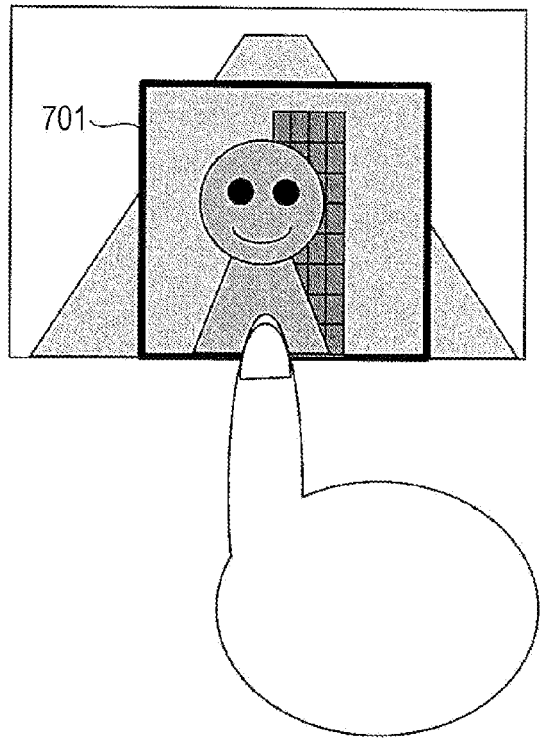
FIG. 7 is a diagram in which an enlarged view centered on the touched position is displayed.

FIG. 4 is an image display surface where the image display surface of FIG. 3 as an example is divided into 25 parts. The preview screen is divided in the object selection, and the operator may thereby select the object more easily. In a case of selecting the object H3, if an area 401 indicated by bold lines in FIG. 4 is selected, the position that provides the best focus for the object in the area 401, that is, the object H3 becomes the focal position for the area 401. In a case where the size of the object that is displayed on the image display surface of a digital camera, a cellular phone, or the like is small, it is not easy for the operator to select the object, but as illustrated in FIG. 4, selecting the area makes the operation simple. Further, a configuration is provided such that the position or area selected by the operator is displayed in an enlarged manner and the operator performs the selection on the enlarged display screen, and further preferable object selection is thereby enabled. FIG. 5 illustrates one example of the preview screen that is displayed on the image display surface and includes an object H5, an object B5, and an object M5. Because the object B5 and the object M5 are adjacent to the object H5 on the preview screen, as illustrated in FIG. 6, it is not easy for the operator to touch only the object H5 on the image display surface by a finger 601. Thus, as illustrated in FIG. 7, a configuration is provided such that an enlarged view 701 with the touched position being the center is displayed when the operator touches the screen and the operator selects the object on the enlarged view 701, and the object displayed small on the preview screen may thereby be selected more accurately. The enlarged view 701 illustrated in FIG. 7 may enlarge a prescribed area around the position touched by the operator as the center or may enlarge the area to which the position touched by the operator belongs in a case where the screen is divided as FIG. 4. As the selection method on the enlarged view, for example, there is a method in which the enlarged view is displayed by a first touch and the object is selected by a second touch made after the finger of the operator is once detached from the screen. In a case of the enlarged display, after the selection is finished, the enlarged display is finished, and the preview screen is restored.

Figure 8:
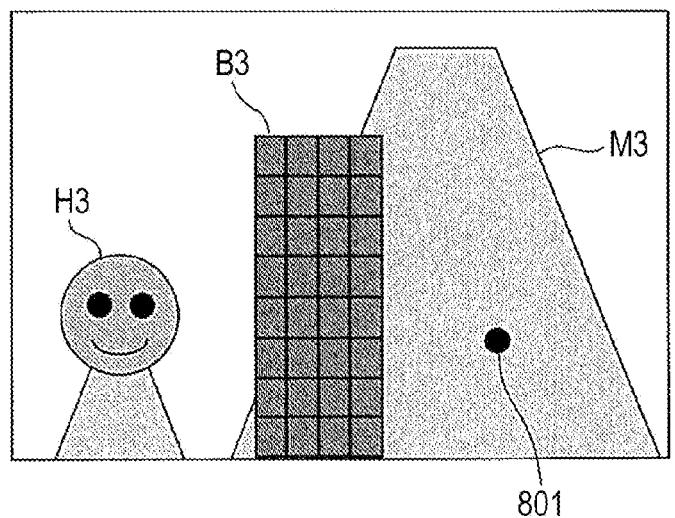
FIG. 8 is a diagram that illustrates a situation where the operator touches only an object M3 on the image display surface by the finger.
Figure 9:
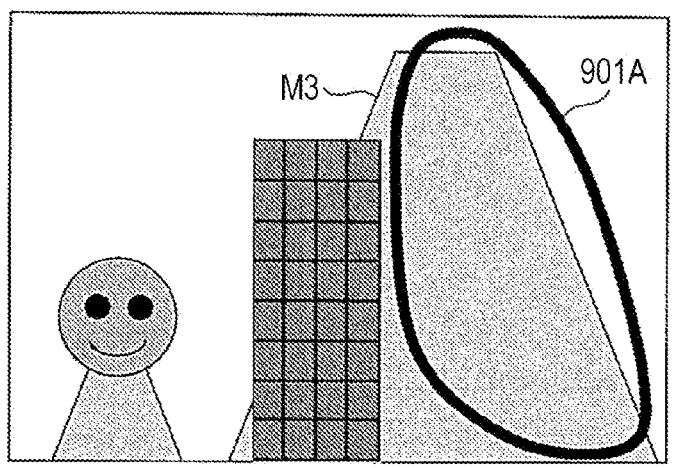
FIG. 9 is a diagram that illustrates a situation where an arbitrary area is specified not by pointing but by encircling the area and a probability is thereby improved that the specified area includes a high frequency component of the object selected by the operator.
Figure 9:
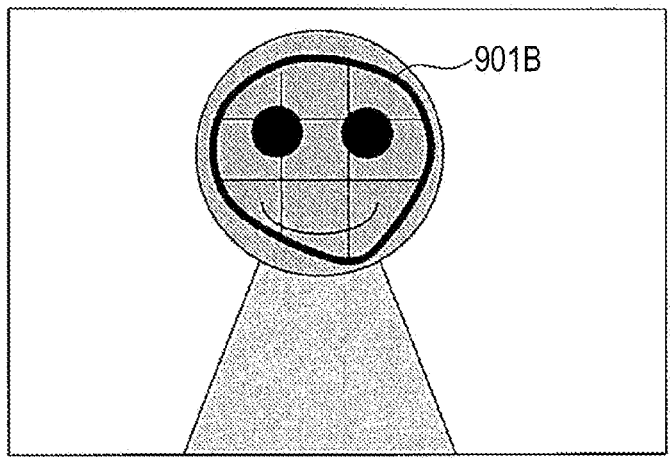

In addition, further preferable object selection is enabled by allowing the operator to select an arbitrary area. In FIG. 8, in a case where the operator selects the object M3 and specifies a point 801, the area around the point 801 is a flat area, and the high frequency components are low. Thus, it is not easy to accurately detect the focal position that provides the best focus for the point 801 by the contrast procedure. Thus, as an area 901A surrounded by bold lines, which is illustrated in FIG. 9(*a*), and an area 901B surrounded by bold lines, which is illustrated in FIG. 9(*b*), an arbitrary area is specified not by pointing but by surrounding the area, and the probability is thereby improved that the specified area includes a high frequency component of the object selected by the operator. This enables the focal position to be accurately detected. As for the selection method of the area, for example, the operator moves the finger on the screen from the point (starting point) on the screen, which the operator first touches, and performs an operation of returning to the starting point so as to surround a prescribed area, and the area may thereby be specified.

Next, a flow from S203 to S205 will be described. As described above, S203 to S205 may be configured such that the focal position may be calculated and stored each time when the operator selects one object and the selection and the focal position calculation may be repeated until the selection of all the objects is finished or such that after all the objects whose image the operator desires to capture are selected in S203, the respective focal positions of the objects are calculated in S204, and the process progresses to S205.

A further detailed description will be made about the configuration in which the focal position is calculated and stored each time when the operator selects one object and the selection and the focal position calculation are repeated until the selection of all the objects is finished.

It is preferable that the operator be capable of confirming whether the focus is correctly set on the selected object when the operator sets the focus on the selected object because the operator may recognize a case where the focus is set on a position different from the intention of the operator and image capturing in the focal position different from the intention may be reduced.

Figure 10:
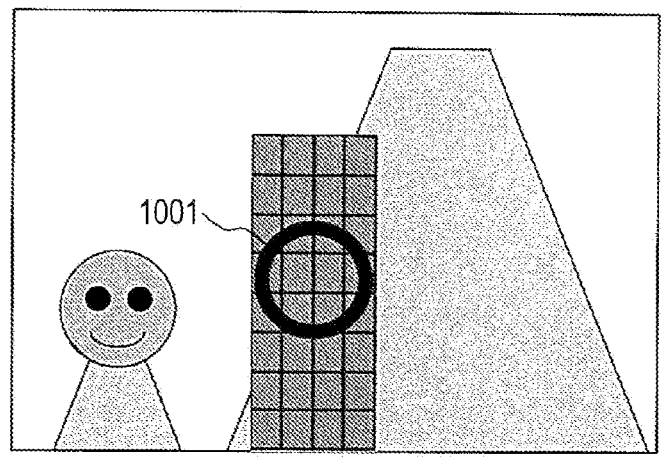
FIG. 10 is a diagram that illustrates an example where display is performed so that the operator may confirm the object that is already selected on the screen.
Figure 11:
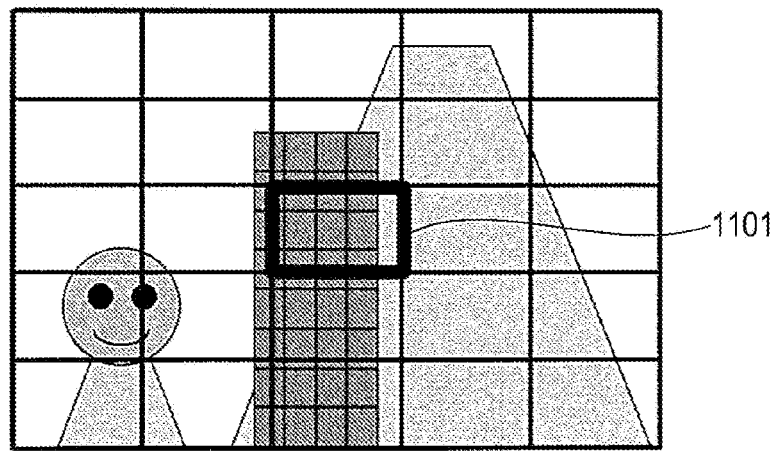
FIG. 11 is a diagram that illustrates an example where display is performed so that the operator may confirm the object that is already selected on the screen.

Accordingly, in this embodiment, an image in which the object is selected and the focus is set on the selected object is displayed on the preview screen. The display on the preview screen allows the operator to confirm whether the focus is correctly set on the target object. Further, the enlarged display illustrated in FIG. 7 further facilitates the confirmation. When the first object selection and focal position calculation are finished, the second object selection is performed. Here, a description will be made about the preview screen in the second object selection. In a case where the image in which the focus is set on the object that is first selected is displayed on the preview screen for the second object selection and the foreground or the background is particularly in focus, the object that the operator desires to select as the second object may be as blurry as the object is unidentifiable. Thus, in the second object selection, it is preferable that the preview screen be returned to the preview screen at the time when the all in-focus mode is configured in terms of the object selection. The preview screen at the time when the all in-focus mode is configured is the above-described state where the foreground to the background are in focus to the extent that the objects are identifiable from the foreground to the background. However, in a case where the preview screen is returned to the first preview screen, which objects are already selected may not be confirmed on the screen, and the operator has to remember the objects. Thus, display is performed so that the operator may confirm the already selected objects on the screen. For example, the first selected object or area is displayed on the preview screen in a superimposing manner as an area 1001, which is indicated by a bold-line circle in FIG. 10. Further, in a case where the selected area is a divided area as illustrated in FIG. 4, a selected divided area 1101 may be displayed while being emphasized by a bold-line frame as illustrated in FIG. 11. Further, only the selected divided area may not be returned to the preview screen, and the image in which the focus is set on the object that is first selected may be displayed.

Performing the above display facilitates recognition of which object is first selected in the second object selection. In addition, in the third object selection, the first selected object and the second selected object or area may be displayed on the preview screen in a superimposing manner as areas 1201 and 1202, which are indicated by bold-line circles in FIG. 12, or may be displayed while being emphasized by bold-line frames as areas 1301 and 1302 illustrated in FIG. 13.

As described above, in the configuration in which the object selection and the focal position calculation are repeated, the preview screen is displayed such that the object or area that is already selected is identifiable, and the operator may thereby select plural objects further properly.

Figure 12:
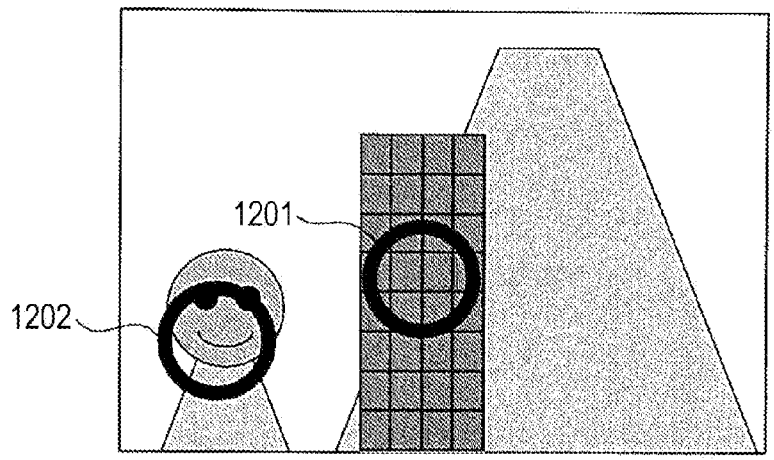
FIG. 12 is a diagram that illustrates an example where a first selected object and a second selected object or area are displayed on the preview screen in a superimposing manner.
Figure 13:
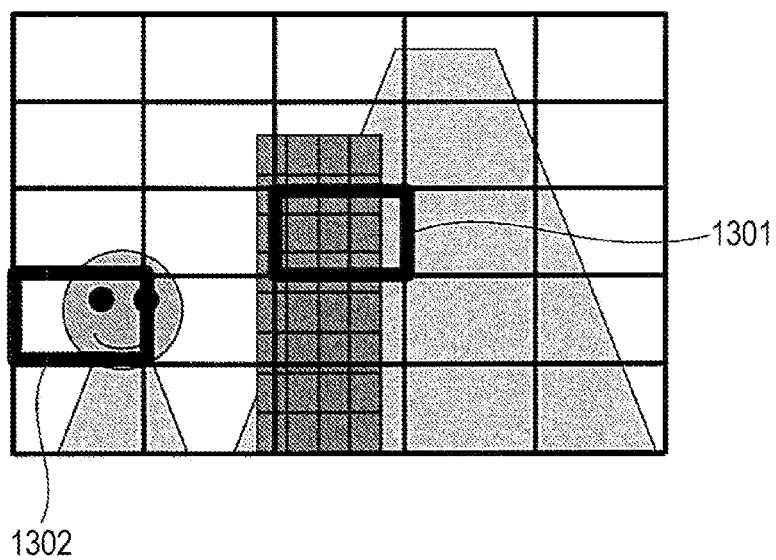
FIG. 13 is a diagram that illustrates an example where the first selected object and the second selected object or area are displayed while being emphasized by bold-line frames.

Next, a more detailed description will be made about the configuration in which all the objects whose images the operator desires to capture are selected and the respective focal positions of the objects are thereafter calculated and stored. As illustrated in FIGS. 10 and 11, when the first object is selected, the selected object or area is distinctively displayed on the preview screen in a superimposing manner. The display is similarly performed as illustrated in FIGS. 12 and 13 in a case where the second and third objects are selected. Then, when the object selection is finished, the process progresses to S204. The respective focal positions of the selected objects are calculated, and the focal position information is stored in the storage apparatus 105. It is preferable that the operator be capable of confirming whether the focus is correctly set on the desired objects when the calculation of the focal positions is finished because the operator may recognize a case where the focus is set on a position different from the intention of the operator and image capturing in the focal position different from the intention may be reduced.

Figure 14:
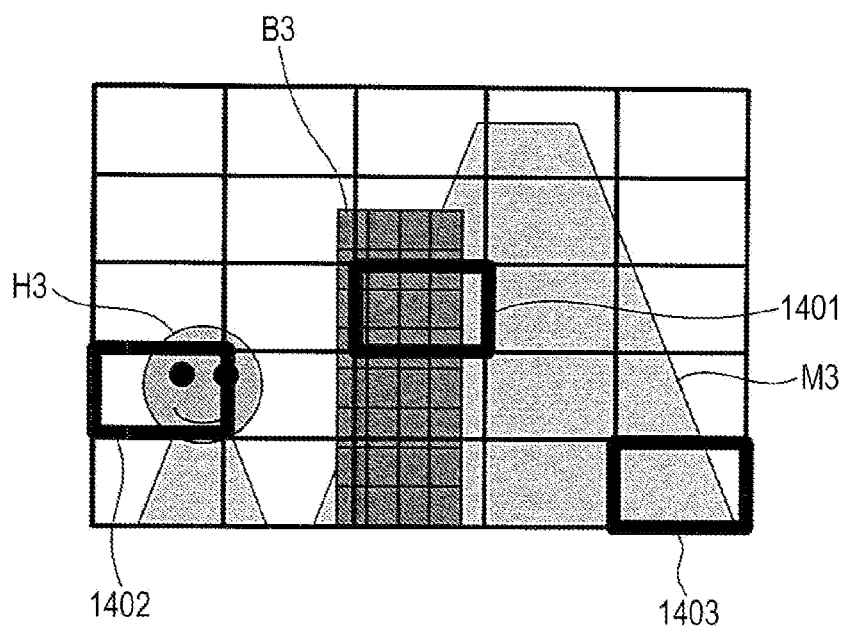
FIG. 14 is a diagram that illustrates an example where the selected areas are distinctively displayed on the preview screen.

Thus, when the calculation of the focal positions is finished, the selected areas are distinctively displayed on the preview screen as areas 1401, 1402, and 1403 illustrated in FIG. 14. Here, an image in which the focus is set on the area 1401 is displayed in the area 1401, and it may thereby be confirmed whether the desired object (B3) is in focus. Similarly, an image in which the focus is set on the area 1402 is displayed in the area 1402, an image in which the focus is set on the area 1403 is displayed in the area 1403, and the operator may thereby confirm whether all the selected objects (B3, H3, and M3) are in focus on one preview screen. The images of the selected objects in the respective focal positions are saved in the storage apparatus 105 when the focuses are set and displayed on the preview screen after the selection is finished.

Next, the image capturing in S206 will be described. As for movement from S205 to S206, for example, a determination is made that the object selection is finished in a case where the operator presses the shutter button, and the process may then move to the image capturing in S206. Further, in a case where the image display unit 102 is a touch panel, display such as "finish selection" is performed on the preview screen, and a determination may be made that the object selection is finished when the operator touches "finish selection". Further, in a case where the number of objects to be selected is in advance decided, the process may move to the image capturing at the point when a decided selection frequency is reached. When the process moves to the image capturing, the configured number of images are successively captured based on the focal position information recorded in the storage apparatus. If the process to photographing in the sequence of the selection, focusing, and the image capturing is performed each time when one object is selected, the object may move while the object is being selected. Thus, all the focal positions are configured before the image capturing, and images are successively captured based on the configuration. This enables the time lag between the captured images to be reduced and is preferable for S207 (all in-focus image synthesis), which will be described below.

Next, a description will be made about an image capturing order in a case of successively capturing images while changing the focal position. In this embodiment, images are captured in the respective focal positions of the plural objects that are selected by the operator, and an image in which all the objects whose images the operator desires to capture are in focus is thereby obtained. In a case of capturing images while changing the focus, capturing images from the image with the closer focal position to the image with the farther focal position provides the following effects. In a case where images are captured from the image with the closer focal position, the change in the focal position occurs in the same direction from the first image capturing to the final image capturing. Thus, an effect of reducing a focus driving time is obtained, compared to a case where the focal position is changed in a random order. That is, the order that needs the shortest time for successive image capturing may be obtained. An image capturing time is reduced, and movement in a case of photographing a moving object may thereby be kept to the minimum. That is, the offset between corresponding points of plural images may be reduced. This enables further preferable synthesis in a synthesis process in S207. Further, in a case of capturing images from the image with the closer focal position to the image with the farther focal position, the change in the focal position also occurs in the same direction. This provides similar effects to the case of capturing images in the order from the farther side to the closer side.

Figure 15:
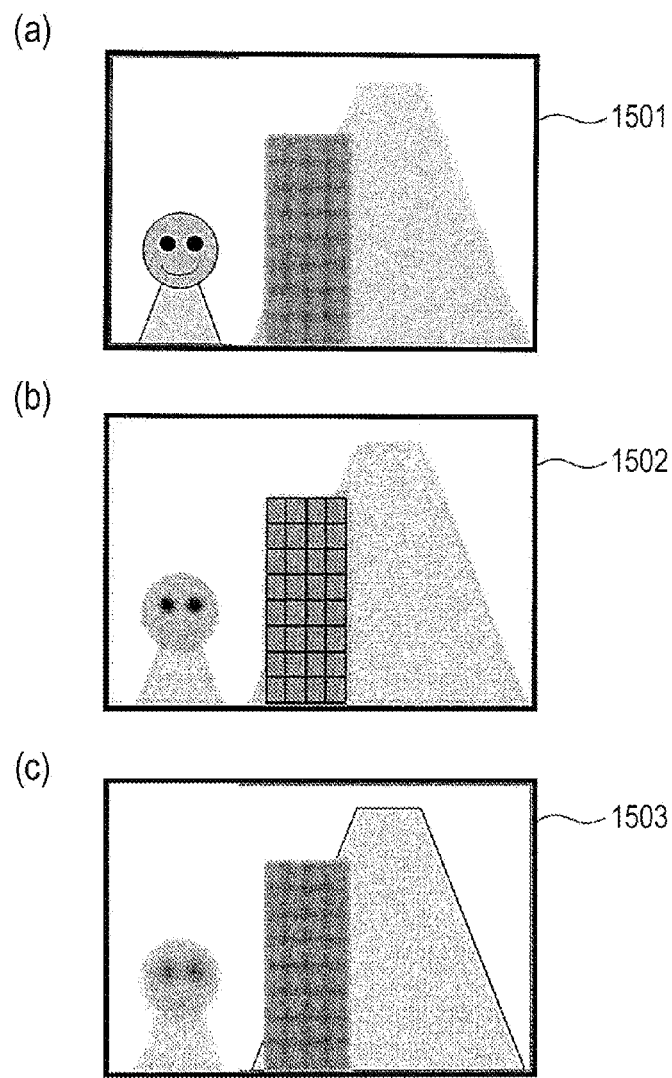
FIG. 15 is a diagram that illustrates respective captured images of the objects in the order of closeness.

Further, changing the focal position in the same direction further provides the following effects. In S207 (all in-focus image synthesis), which will be described below, the corresponding points between plural images used in the synthesis have to be searched for. In a case of searching for the corresponding points, the search is easier in a case where the similarity between the plural images is high. For example, the precision of the focuses in corresponding areas are very different between an image in which the foreground is in focus and the background is blurry and an image in which the background is in focus and the foreground is blurry. Thus, the search for corresponding points may not be easy. Taking the above point into account, in a case where images are captured while the focus position is changed in the same direction, comparison between two images that are successively captured facilitates the search for corresponding points because the focal positions are close compared to the focal positions in other images. Further, because an image capturing interval is short and the offset in an object position is thus small, the image capturing order that is appropriate for the search for corresponding points is obtained. A description will be made about a case where images of the objects H3, B3, and M3 in FIG. 3 are captured as an example. When images are captured in the order of the objects H3, B3, and M3 from the closer side, the respective images are an image 1501, an image 1502, and an image 1503, which are illustrated in FIG. 15. In a case of searching for corresponding points between the two images 1501 and 1503, the search for corresponding points is not easy because the blurriness is largely different between the two images. On the other hand, in a case where the corresponding points between the image 1501 and the image 1503 are searched for with the image 1502 being a reference, similarity is high compared to a case of searching for the corresponding points from the two images 1501 and 1503. Thus, the search for the corresponding points becomes easier.

Further, capturing images while sequentially changing the focal position from the closer side further provides the following effects. In a case where the object whose images are captured is a moving object, there is a time lag between the decision of the focal position and the image capturing. Thus, the position of the object may move in the time from the decision of the focal position to the image capturing. Particularly, the close object exhibits large movement amount and change in the precision of the focus in the captured image compared to the far object, even if the amount of motion is the same. For example, when the object in a distance of 100 m moves forward by 50 cm, the precision of the focus does not largely change. However, when the object in a distance of 1 m moves forward by 50 cm, the precision of the focus may largely change. In a case of capturing images while changing the focal position from the closer side, the time from the finish of the object selection to the image capturing on the closest side may be made shortest, and the offset in the focus due to the above-described motion of the object may thereby be reduced.

Taking the above point into account, for the foremost focal position among the plural focal positions that are configured before the image capturing, the focus is again set, and consecutive image capturing is performed. Accordingly, the offset in the focus due to the motion of the close object may be reduced. For example, in a case where the areas 1401, 1402, and 1403 illustrated in FIG. 14 are selected by the operator, the respective pieces of focal position information are stored in the storage apparatus 105, and images are captured in three focal positions, the focus is again set for the area 1402 that is the foremost focal position before the image capturing. The first image is captured in the focal position that provides the best focus for the area 1402, and the second and third images are captured while the focal positions are configured to the focal positions recorded in the storage apparatus 105. Accordingly, the offset in the focus due to the motion of the object may further be reduced.

Next, a description will be made about the number of captured images in a case of performing the consecutive image capturing. When the number of captured images is large, the image capturing in finely set focal positions is enabled. However, there is a problem that the time needed for the image capturing becomes long, the storage apparatus that stores the images needs a large capacity, and the throughput needed for the all in-focus image synthesis also increases. On the other hand, when the number of captured images is small, the throughput decreases, but the focuses may not be set on all the objects whose image the operator desires to capture. The number of consecutively captured images may be decided taking the above points into account.

A description will be made below about a configuring method of the number of captured images and the focal positions. a5

Figure 16:
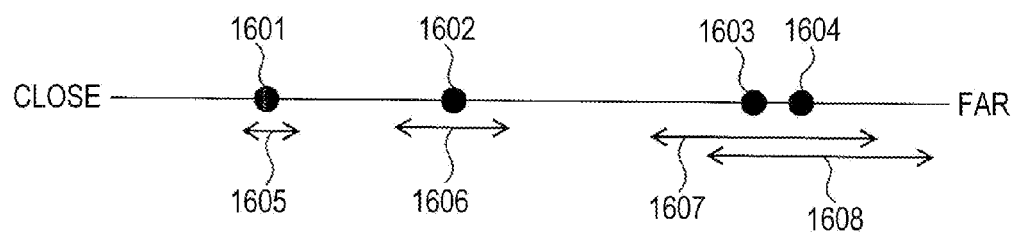
FIG. 16 is a diagram that illustrates focal positions and respective depths of field in the focal positions in a case where four objects positioned in different distances are selected.
Figure 17:
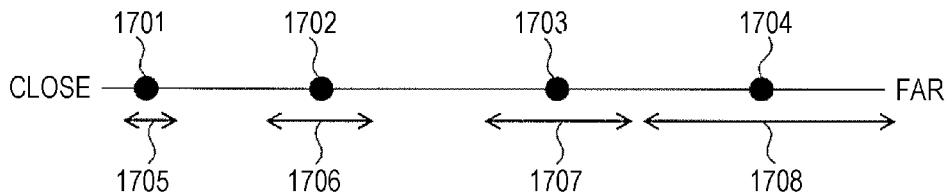
FIG. 17 is a diagram that illustrates the depths of field in a case where four objects positioned in different distances are selected by the operator and images are captured while the focuses are set on respective object positions.
Figure 18:
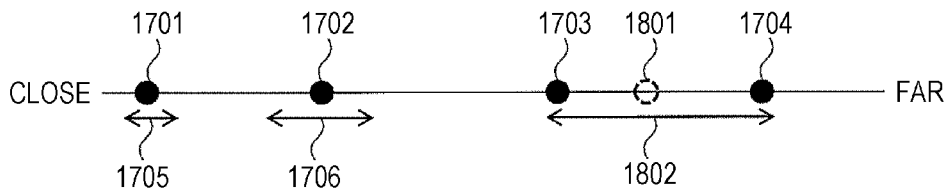
FIG. 18 is a diagram that illustrates the focal positions and the respective depths of field in the focal positions in a case where three objects positioned in different distances are selected.

First, a description will be made about an image capturing method in a case where the number of captured images is fixed. Here, it is assumed that the number of captured images is configured to three. FIG. 16 illustrates focal positions 1601, 1602, 1603, and 1604 and respective depths of field 1605, 1606, 1607, and 1608 in the focal positions in a case where four objects positioned in different distances are selected. The depth of field changes in accordance with the distance from the image capturing apparatus, and the closer foreground has the smaller depth of field. As FIG. 16, in a case where the number of the selected objects (four) is selected by the operator to the configured number of captured images (three), the focal positions are reconfigured taking the object positions and the depths of field into account, and preferable image capturing is thereby realized with the configured number of images. In the case of FIG. 16, both of the object 1603 and the object 1604 are included in one of the depth of field 1607 or the depth of field 1608. Thus, only by capturing an image in either one of the focal positions, an image in which the selected two objects are in focus may be obtained. That is, images are captured in the three focal positions 1601, 1602, and 1603, and images in which all the four objects are in focus may thereby be obtained. Further, FIG. 17 illustrates depths of field 1705, 1706, 1707, and 1708 in a case where four objects 1701, 1702, 1703, and 1704 that are positioned in different distances are selected by the operator and images are captured while the focuses are set on respective object positions. The difference between FIGS. 16 and 17 is the point that the depths of field in the focal positions of the four objects do not at all overlap with each other in FIG. 17. In the case of FIG. 17, if three of the four focal positions are selected, because the respective depths of field do not overlap each other, an image in focus may not be obtained for the object that is not selected. Thus, as illustrated in FIG. 18, a new focal position 1801 is configured between the object 1703 and the object 1704. The focal position 1801 has a depth of field 1802, and the depth of field 1802 includes both of the object 1703 and the object 1704. That is, the focal positions are reconfigured to the objects 1701, 1702, and 1801, and an image in which all the four objects 1701 to 1704 whose images the operator desires to capture are in focus may thereby be obtained by capturing three images.

Figure 19:
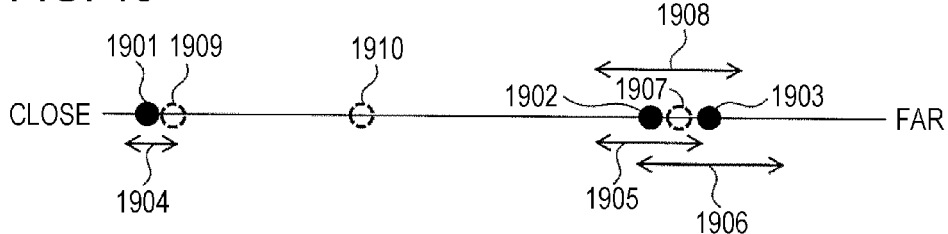
FIG. 19 is a diagram in which two focal positions are configured and images in which all three objects whose images are desired to be captured are in focus are obtained.

Next, a description will be made about a case where minimum necessary focal positions for capturing an image in which all the selected objects are in focus are less than the configured number of captured images. FIG. 19 illustrates focal positions 1901, 1902, and 1903 and respective depths of field 1904, 1905, and 1906 in the focal positions in a case where three objects positioned in different distances are selected. In the case of FIG. 19, the focal position is configured to a new point 1907, and both of the objects positioned in the focal positions 1902 and 1903 are in a depth of field 1908 of the point 1907. Thus, an image in which the two objects are in focus may be obtained by capturing one image. Accordingly, the two focal positions 1902 and 1903 are changed to the new focal position 1907. Then, by reconfiguration, the image capturing position of the one left image among three images as the configured number of captured images is configured to a position close to the focal position 1901 on the closest side, for example, a focal position 1909. Capturing images while finely changing the focal position on the closer side provides an effect of reducing the offset in the focus due to the motion of the object. Further, in a case where the object does not move, configuring a new focal position on the closer side provides the following effects. In a case where the object has a depth, for example, a case of photographing the face of a person that faces the image capturing apparatus in the right front, the nose is closest, and a part around the ear is farther than the nose. In such a case, because the depth is different between the nose and the ear, the ear may be out of focus when the focus is set on the nose, or the nose may be out of focus when the focus is set on the ear. Accordingly, it is highly possible that the object on the closer side is not in focus due to even a small difference in the depth. Thus, it is preferable to capture images while changing the focus more finely.

Further, configuring a new focal position 1910 provides an effect of facilitating the search for corresponding points in the all in-focus image synthesis.

Figure 20:
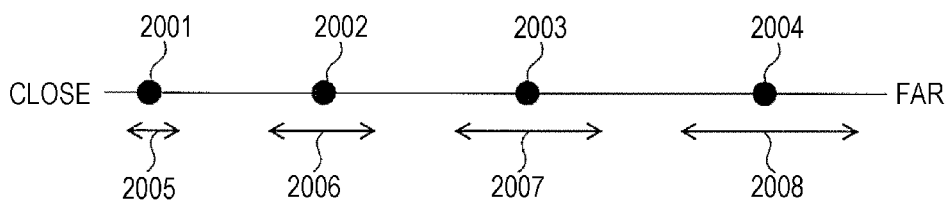
FIG. 20 is a diagram that illustrates a situation where in a case where all the objects in four positions may not be in focus, a fourth focal position is newly configured, four images are successively captured, and images in which all the selected objects are in focus may thereby be obtained.

Next, a description will be made about a configuration in which the operator may configure the number of captured images. Such a configuration is preferable because the operator may configure the number of captured images in accordance with the number of objects whose image the operator desires to capture and the operator may appropriately configure the just sufficient number of captured images compared to a case where the number of captured images is in advance decided. For example, in the case of FIG. 19, the focal positions are configured to the two positions 1901 and 1907, and an image in which all three objects whose images are desired to be captured are in focus may thereby be obtained. Reducing an image capturing frequency provides effects of reducing the image capturing time, reducing an amount of use of the storage apparatus for saving images, and reducing the throughput in the all in-focus image synthesis in a later description. As illustrated in FIG. 20, in a case where the number of images that is in advance configured is three and all the objects in four positions 2001, 2002, 2003, and 2004 may not be in focus even if the three focal positions are configured in any combination, a fourth focal position is newly configured, four images are successively captured, and an image in which all the selected objects are in focus may thereby be obtained.

Figure 21:
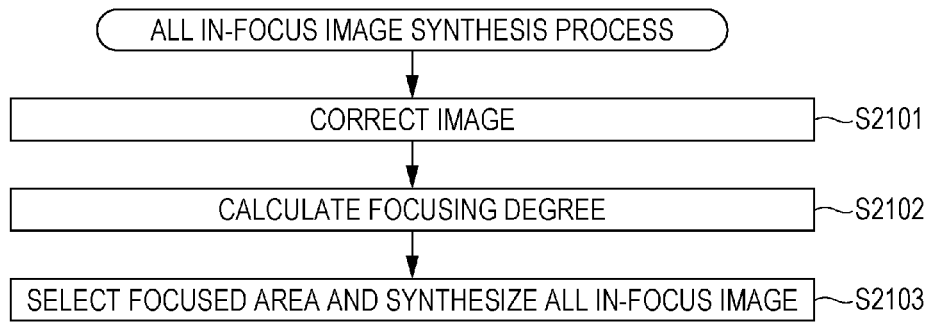
FIG. 21 is a diagram that illustrates a flowchart of an all in-focus image synthesis process.

Next, a synthesis method of an image in S207 will be described. FIG. 21 illustrates a flowchart of an all in-focus image synthesis process. In S2101, corrections to plural images that have different focuses are performed. In a case of capturing images while changing the focus, the size of the object may be different due to different angles of view. Further, in a case where, because there is a time lag in the image capturing, the image capturing position moves due to camera shake or the like by the operator, or the object moves, the offset in the position of the moving object in the image may occur. Thus, in S2101, the offset in the position and the size of the object whose captured image is common to plural images are corrected. Next, in S2102, the focusing degree of each of the images is calculated. A focusing degree is a degree of precision of the focus. The higher focusing degree allows the image to be captured in the better focus and the clearer image of the object to be captured. The focusing degree may be obtained by a method of calculating the high frequency components, for example. In S2103, based on the focusing degree calculated in S2102, pixels (area) with the highest focusing degree in corresponding pixels (corresponding areas) are selected from the images, and the all in-focus image is thereby synthesized.

As described above, in this embodiment, the plural focal positions are configured based on the selection by the operator, images are successively captured in the configured focal positions, images of all the objects whose images the operator desires to capture are clearly captured in the images that are successively captured, and a clear image in which all the objects whose images the operator desires to capture are in focus may thereby be provided.

(Second Embodiment)

Next, a second embodiment will be described. In the second embodiment, the selection is performed by a selection means that reflects priority for the operator, and focus control and successive image capturing based on the priority are performed.

As for a selection method that reflects priority, for example, in S202, a sentence such as "select in a desired image capturing order" is displayed in the preview screen, and information may thereby be obtained that the first selected object has the highest priority and the second selected object has the second highest priority. Further, a selection means that not only uses ranks of priority but also performs weighting allows the object selection that further reflects the intention of a user to be performed. As a method of performing weighting, there is a method that performs weighting by using a selection frequency. In a case where the priority order is the object H3, the object M3, and the object B3 in FIG. 3 and the image display unit 102 is a touch panel, for example, the object H3 is touched three times, the object M3 is touched twice, the object B3 is touched once, and the priority may thereby be configured to the order of the object H3, the object M3, and the object B3. In a case where the priority is equivalent between plural objects, for example, the same frequencies such as the combination (three times, once, once) are configured, and the same weights may thereby be configured. Further, in a case where there is an object with very high priority, for example, the combination (ten times, twice, once) allows the levels of priority to be reflected in the weights. Further, in a case where the priority for the operator changes during the object selection, a change may be performed not by reconfiguring the priority that is once configured from the beginning but by a simple operation. For example, in a case where the three objects H3, M3, and B3 in FIG. 3 are once weighted by the combination (three times, twice, once) and the priority of the object B3 with the lowest priority thereafter becomes highest, the third object B3 is touched three more times, and touch frequencies of the objects thereby become the combination (three times, twice, four times). Accordingly, the highest priority may be configured for the third object B3.

Figure 22:
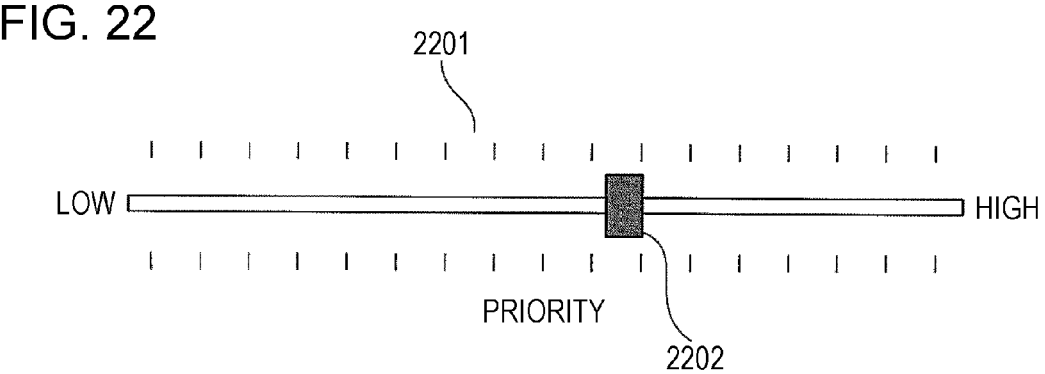
FIG. 22 is a diagram in which a slider bar is displayed in a position or area selected by the operator and a weight is configured by an operation of a slider.
Figure 23:
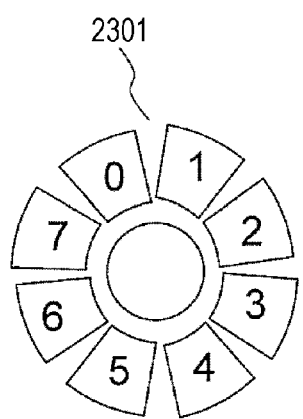
FIG. 23 is a diagram that illustrates a situation where numbers of zero to seven indicate the weight to be selected.

A slider bar 2201 illustrated in FIG. 22 is displayed in a position or area selected by the operator, and the weight may be configured by an operation of a slider 2202. The slider bar is used, and the priority may thereby be configured by one operation for each object regardless of the level of priority. Further, in a case of changing the priority, the object whose priority is desired to be changed is again selected, and only the slider is operated. Thus, the configuration may be changed by a very simple operation. Further, a weight configuring method illustrated in FIG. 23 may be used. The numbers zero to seven illustrated in FIG. 23 indicate the weights. When the operator selects the object, a weight configuration screen illustrated in FIG. 23 is displayed, and the weight may then be selected. Similarly to the slider bar, the weight may be configured by a simple operation. A change or cancellation (for example, a configuration to zero) of the configuration may be performed by a simple operation.

When the operator selects plural objects, the operation becomes simple in a case where the operator may recognize the weights that the operator already inputs. Accordingly, in addition to the display illustrated in FIGS. 12 and 13 that indicates the selection, for example, input weight numbers are displayed around the selected areas, and the operator may thereby recognize the values of the weights. Further, in a case where the selected area is indicated by surrounding the area by the bold lines, the recognition may be facilitated by increasing the boldness of the bold lines in the order of the largeness of the weight. Further, changing the color of the display that indicates the selection may facilitate the recognition. For example, the color of the bold lines that indicate the selection is changed to red, yellow, and blue in the order of the largeness of the weight, and the recognition may thereby be facilitated.

Figure 24:
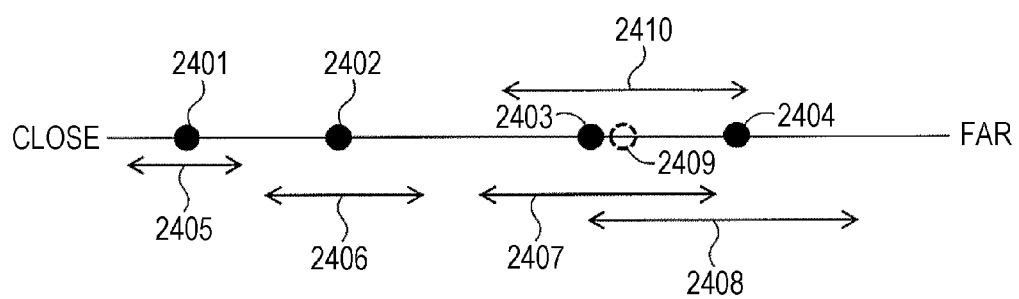
FIG. 24 is a diagram that illustrates four objects selected by the operator and the depths of field in a case of capturing images in respective positions.

Next, a description will be made about effects in a case of selecting objects while reflecting the priority. FIG. 24 illustrates four objects 2401, 2402, 2403, and 2404 that are selected by the operator and depths of field 2405, 2406, 2407, and 2408 in a case of capturing images in respective positions. In FIG. 24, the number of captured images is configured to three, and the priority of the selected objects is the objects 2403, 2401, 2402, and 2404 in the descending order. The objects 2403 and 2404 are positioned in a short distance. Thus, an image is captured in the focal position where both of the two objects are in one depth of field, and an image in which the two objects are in focus may thereby be obtained by capturing one image. In this embodiment, a configuration based on the priority is performed when the focal positions are configured. The focal position is configured to a position where an image of 2403 is captured as clearly as possible within a range where both of the two objects 2403 and 2404 are positioned in one depth of field. That is, the focal position is configured to a position as close to the object 2403 as possible. In FIG. 24, a position 2409 is configured as a new focal position, and both of the objects 2403 and 2404 thereby fall in one depth of field 2410. In addition, because the object 2403 is positioned at an approximate center of the depth of field 2410, a clearer image may be obtained than setting the focus in the middle of 2403 and 2404.

Figure 25:
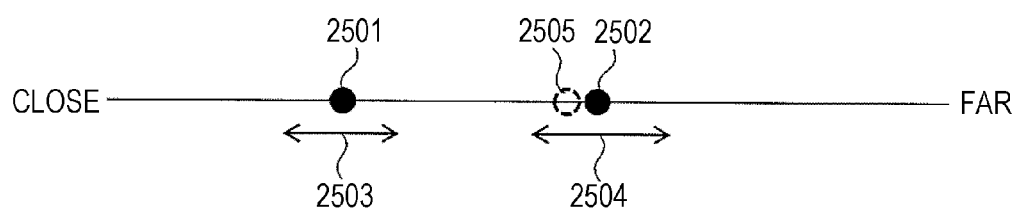
FIG. 25 is a diagram that illustrates objects selected by the operator and the corresponding depths of field.
Figure 26:
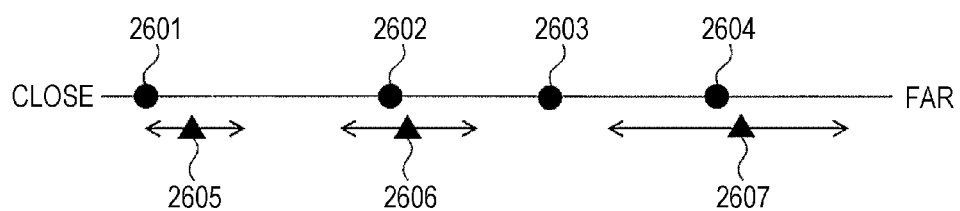
FIG. 26 is a diagram that illustrates positions of four objects and focal positions in a case of successively capturing three images.
Figure 27:
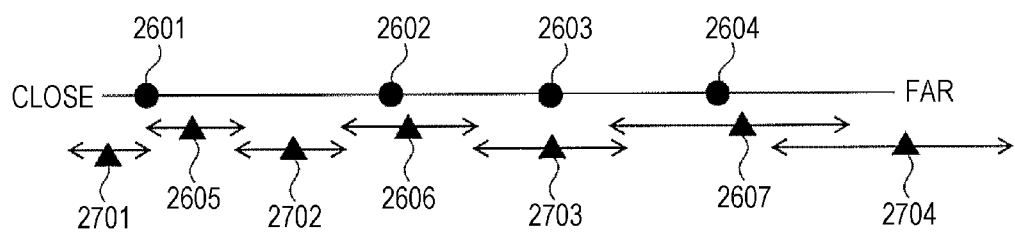
FIG. 27 is a diagram in which a new focal position is added to three focal positions in FIG. 26.

Next, FIG. 25 illustrates objects 2501 and 2502 that are selected by the operator and the corresponding depths of field 2503 and 2504. In FIG. 25, the number of captured images is configured to three, and the priority of the selected objects is 2502 and 2501 in the descending order. The number of the selected objects is two to the number of captured images that is three. Thus, two images are captured while the focus is set to the respective objects among the three images to be captured, and the one left image may be captured in a configuration based on the priority. In order to increase the probability of capturing a clear image while setting the focus on the object with high priority, the left one focal position is configured to the focal position around the object 2502 with high priority like a position 2505 illustrated in FIG. 25. Capturing two images in close focal positions may increase the probability that an image is captured while the focus is set on the object 2502. Further, capturing the one left image in the very same position as the object 2502 may reduce noise. Capturing two images in the same focal position allows two images at the same focusing degree to be obtained. By averaging those images, blurriness may be avoided because of the equivalent focusing degree, and a noise reduction effect by the averaging may be obtained. Similarly, it is assumed that the number of captured images is six and three objects are selected. Among the six images to be captured, the focal positions of three images are set around the object with the highest priority, the focal positions of two images are set around the object with the second highest priority, the focal position of the one left image is set on the object with the lowest priority, and the images are thereby captured. Accordingly, the successive image capturing may be performed such that the probability that the image capturing is successful reflects the intention of the operator.

Further, in a case where the number of captured images is in advance configured and the focus may not be set on all the objects selected by the operator even if the focal positions of the decided number of images are configured in any combination, the focal positions are configured in the priority order so that the focus is set on the objects with higher priority, and the successive image capturing may thereby be performed such that the focus is set on the objects with higher priority.

As described above, in the second embodiment, images of the objects whose images the operator desires to capture are captured as clear images in focus in any of images that are successively captured, based on the object selection information that is input by an object selection means which reflects the priority for the operator. In addition, the focal positions are configured such that images of the objects that have high priority for the operator are captured as images at a high focusing degree. Accordingly, a clear image may be provided in which all the objects whose images the operator desires to capture are in focus and particularly the objects with high priority are at a high focusing degree.

The present invention includes the following disclosures.

(1) An image capturing apparatus including: an image capturing unit that captures an image; a focus control unit that controls a focus of the image capturing unit; an object selection unit that is capable of selecting an object; and an image processing unit that performs image processing of an image that is captured by the image capturing unit, in which the image capturing unit captures plural images in which the focus is changed by the focus control unit, at least one of the plural images is captured based on a focal position of an object that is selected by the object selection unit, and the image processing unit generates an image in which a depth of field is expanded compared to the one captured image from the plural images.

(2) The image capturing apparatus that is disclosed in (1), in which at least one of the plural images is captured in a focal position that is positioned between focal positions of plural objects whose selection is received by the object selection unit.

(3) The image capturing apparatus that is disclosed in (1), in which the object selection unit is an object selection unit that receives and reflects priority for an operator, and at least one of the plural images is captured in a focal position in which a focusing degree of an object with high priority which is received by the object selection unit becomes high.

(4) The image capturing apparatus that is disclosed in any one of (1) to (3), in which the focus control unit controls the focus such that a moving direction of respective focal positions in a case of capturing the plural images becomes a same direction.

(5) The image capturing apparatus that is disclosed in any one of (1) to (4), in which the image processing unit generates an image in which the depth of field is expanded compared to the one captured image from the plural images.

(6) An image capturing method by an image capturing apparatus including: an image capturing unit that captures an image; a focus control unit that controls a focus of the image capturing unit; an object selection unit that is capable of selecting an object; and an image processing unit that performs image processing of an image that is captured by the image capturing unit, in which the image capturing unit captures plural images in which the focus is changed by the focus control unit, at least one of the plural images is captured based on a focal position of an object that is selected by the object selection unit, and the image processing unit generates an image in which a depth of field is expanded compared to the one captured image from the plural images.

(7) A program that causes a computer to execute the image capturing method that is disclosed in above (6).

(8) A recording medium that is computer-readable and records the program that is disclosed in above (7).

The embodiments of the present invention have been described in detail with reference to the drawings in the foregoing. However, a specific configuration is not limited to the above-described configurations, and various design modifications or the like are possible within a scope that does not depart from the gist of the present invention.

Further, in the above embodiments, the configurations and so forth illustrated in the attached drawings are not limited to those but may appropriately be modified within the scope where the effects of the present invention may be obtained. In addition, the present invention may be practiced with appropriate modifications without departing from the scope of objects of the present invention.

Further, the elements of the present invention may arbitrarily be selected, and inventions that include the selected configurations are included in the present invention.

Further, a program for realizing functions that are described in the embodiments may be recorded in a computer-readable recording medium, the program that is recorded in the recording medium may be read and executed by a computer system, and a process of each unit may thereby be performed. It should be noted that the "computer system" herein includes an OS and hardware such as peripheral devices.

Further, the "computer system" includes a homepage providing environment (or display environment) in a case where the WWW system is used.

Further, "computer-readable recording media" are portable media such as flexible disks, magneto-optical disks, ROMs, and CD-ROMs and storage apparatuses such as hard disks that are built in the computer system. In addition, the "computer-readable recording media" include elements that dynamically retain the program for a short period of time like communication wires in a case where the program is transmitted via a communication line such as a network like the Internet and a telephone line and elements that retain the program for a certain period such as volatile memories in the computer systems that are servers or clients in the above case. Further, the program may realize a portion of the above-described functions and may be realized in combination with a program where the above-described functions are already recorded in the computer system. At least a portion of the functions may be realized by hardware such as an integrated circuit.

REFERENCE SIGNS LIST

10 image capturing apparatus
100 control apparatus
101 image capturing unit
102 image display unit
103 control unit
103-1 focus control unit
103-2 object selection reception unit
103-3 image capturing control unit
104 image processing unit
105 storage apparatus All publications, patents, and patent applications cited herein are incorporated herein by reference in their entirety.

The invention claimed is:

1. An image capturing apparatus comprising:
an imager that captures an image;
a focus controller that controls a focus of the imager; and
an object selection receiver that receives a selection of objects by an operator, wherein:
the imager captures a plurality of images that have differing focal positions while shifting a focal position of the imager,
the focus controller controls the imager to shift the focal position of the imager and to cause the imager to capture the plurality of images by successively capturing the plurality of images while the focal position is shifting from a closer side to a farther side,
the object selection receiver further receives priority for any object to be selected, and
the focus controller controls, based on the priority, the focal position of the imager so that the objects are captured in focus in any of the plurality of images and at least one of the plurality of images is captured at a focal position at which an object whose priority received is higher than other objects has a higher focusing degree than other objects.

2. The image capturing apparatus according to claim 1, wherein:
the focus controller determines, based on the selection received by the object selection receiver, the respective focal positions of the plurality of images successively captured by the imager; and
the focus controller sets a focus again for a foremost focal position before the imager successively captures the plurality of images.

* * * * *